United States Patent [19]

Andersson et al.

[11] Patent Number: 5,496,604
[45] Date of Patent: Mar. 5, 1996

[54] PACKAGING LAMINATE WITH GOOD GAS AND AROMA BARRIER PROPERTIES AND METHOD OF MANUFACTURING THE LAMINATE AND PACKAGING CONTAINERS MANUFACTURED FROM THE LAMINATE

[75] Inventors: Thorbjörn Andersson, Södra Sandby, Sweden; Paul W. Ackermann, Leinfelden-Echterdingen, Germany

[73] Assignee: Tetra Laval Holdings & Finance S.A., Pully, Switzerland

[21] Appl. No.: 14,250

[22] Filed: Feb. 5, 1993

[30] Foreign Application Priority Data

Feb. 7, 1992 [SE] Sweden ................................ 9200353

[51] Int. Cl.⁶ ..................................................... B27N 5/02
[52] U.S. Cl. ...................... 428/34.2; 428/34.3; 428/35.2; 428/35.4; 428/447; 428/451
[58] Field of Search ................................ 428/34.8, 35.7, 428/36.6, 36.7, 36.91, 44.7, 451, 34.2, 34.3, 35.2, 35.4; 383/88, 93, 94, 105, 107, 109, 113, 125, 124

[56] References Cited

U.S. PATENT DOCUMENTS

| | | | |
|---|---|---|---|
| 4,994,310 | 2/1991 | Frisk et al. | 428/34.2 |
| 5,084,352 | 1/1992 | Percec et al. | 428/412 |
| 5,085,894 | 2/1992 | Pascucci et al. | 427/387 |
| 5,091,261 | 2/1992 | Casey et al. | 428/511 |
| 5,096,738 | 3/1992 | Wyman | 427/44 |
| 5,116,649 | 5/1992 | Massouda | 428/34.2 |
| 5,183,706 | 2/1993 | Bekele | 428/349 |
| 5,213,858 | 5/1993 | Tanner et al. | 428/34.2 |
| 5,225,256 | 7/1993 | Marano et al. | 428/34.2 |

FOREIGN PATENT DOCUMENTS

| | | |
|---|---|---|
| 0240571A1 | 10/1987 | European Pat. Off. . |
| 0407880A2 | 1/1991 | European Pat. Off. . |
| 71691 | 3/1982 | Finland . |

Primary Examiner—James J. Seidleck
Assistant Examiner—Michael A. Williamson
Attorney, Agent, or Firm—Burns, Doane, Swecker & Mathis

[57] ABSTRACT

Packaging laminate for conversion through fold forming and sealing to a packaging container with good gas and aroma barrier properties. The packaging laminate has a skeletal layer and a gas and an aroma barrier layer, placed on one side of the skeletal layer, of an organo-functional siloxane polymer which, by means of co-valent bindings, is bound to the skeletal layer by a layer of polyolefine placed between the skeletal layer and the gas and aroma barrier layer.

The packaging laminate can be manufactured through coating one side of a strip of a polyolefine coated paper or cardboard or of polyolefine with a layer of an organo-functional siloxane polymer solution, then drying the layer and finally hardening the dried layer through electron radiation in order to bind the layer co-valently to the strip.

10 Claims, 2 Drawing Sheets

PACKAGING LAMINATE WITH GOOD GAS AND AROMA BARRIER PROPERTIES AND METHOD OF MANUFACTURING THE LAMINATE AND PACKAGING CONTAINERS MANUFACTURED FROM THE LAMINATE

The present invention concerns a flexible packaging laminate in sheet or strip form for conversion through fold forming and sealing to a packaging container with good gas and aroma barrier properties, with this packaging laminate containing a skeletal layer, and a gas and aroma barrier layer of a silicon containing chemical substance applied to one side of the skeletal layer, with the gas and aroma barrier layer being localized, for the purpose of improving the sealing, to only such areas of the packaging laminate as are situated outside the areas along which the packaging laminate is to be sealed during the conversion to the said packaging containers. The invention in addition concerns a method of manufacturing the packaging laminate and packaging containers manufactured from the packaging laminate.

A packaging laminate of the type described above is known through, for example, Swedish patent application no. 8900082-2. The known packaging laminate has a skeletal layer of paper or cardboard and a gas and aroma barrier layer of a silicon compound which may be silicon dioxide ($SiO_2$) or silicon nitride ($Si_3N_4$). The gas and aroma barrier layer, which has a thickness of between 50 and 500 Å, is attached to one side of the skeletal layer with the aid of a separate layer, placed between the skeletal layer and the gas and aroma barrier layer, of a binding agent of the type Bynel (trade name) or other suitable binding agent.

The known packaging laminate, which is described in the Swedish patent application no. 8900082-2, is manufactured, for example, through one side of a strip of polyester being coated with a thin layer of the silicon compound through vacuum deposition, after which the polyester strip thus coated is brought into contact with a strip of paper or cardboard in order to transfer the silicon compound by means of hot stamp technology to selected areas of the paper or cardboard strip to which the silicon coating is bound with the aid of a binding agent which is simultaneously extruded between the two strips.

Through the Swedish patent application no. 8900082-2 it is also known to manufacture packaging containers with good gas and aroma barrier properties from the packaging laminate described. A strip of the packaging laminate is shaped into a tube through the longitudinal edges of the strip being joined to each other in a longitudinal overlap joint. The tube is filled with the contents in question and separated into closed, cushion-like packagings through repeated transverse sealings of the tube across the longitudinal axis of the tube. The packagings are separated from each other by cutting or clipping in the transverse seals, after which the packagings are given the desired final form (usually that of a parallelepiped) through folding in and sealing tight the double-wall triangular corner flaps to an adjacent side of the packaging.

From a prefabricated strip of the packaging laminate, packaging containers with good gas and aroma barrier properties can likewise be manufactured through the strip first being formed into a tube through two longitudinal sides of the strip being joined to each other in an overlap joint. The tube or packaging capsule is afterwards given a suitable bottom closure and filled with the desired contents. The filled packaging capsule is then closed through fold forming and sealing of the top closure field at the upper, open end of the capsule which is delimited by means of fold lines.

The known packaging laminate decsribed above makes possible the manufacture of packaging containers with good gas and aroma barrier properties, but requires a separate layer of binding agent to bind the gas and aroma barrier layer to the skeletal layer, which not only complicates the structure of the packaging material but in addition necessitates an extra extrusion device for applying the layer of binding agent between the skeletal layer and the gas and aroma barrier layer during production of the packaging laminate. The use of the layer of binding agent and the extrusion device necessary with it consequently entails increased material costs and investment costs which in their turn make the packaging laminate produced more expensive.

SUMMARY OF THE INVENTION

An aim of the present invention is therefore to provide a packaging laminate for manufacture of packaging containers with good gas and aroma barrier properties without the consequent disadvantages of the type inherent in the known packaging laminate.

This aim is achieved in accordance with the invention through the fact that a packaging laminate of the type described in the introduction is given the characteristic that the gas and aroma barrier layer is covalently bound to the skeletal layer by a polyolefine layer placed between the skeletal layer and the gas and aroma barrier layer.

Besides the fact that the packaging laminate manufactured according to the invention has a simpler structure and can be manufactured in a less complicated manner than the above described known packaging laminate according to the Swedish patent application no. 8900082-2, the advantage is also gained that the gas and aroma barrier layer is bound with higher adhesion strength to the skeletal layer compared with the corresponding adhesively bound gas and aroma barrier layer in the known packaging laminate. Through the covalent binding between the skeletal layer and the gas and aroma barrier layer it is ensured that no Si fragment is released during conversion of the packaging laminate through fold forming to a packaging container.

Another aim of the invention is to show a method of manufacturing a packaging laminate of the type described in the introduction without the use of a separate binding agent and the separate extrusion device connected with it in order to bind the gas and aroma barrier layer to the skeletal layer.

This aim is achieved according to the invention through the fact that the method is given the characteristics that to selected areas on one side of a sheet or strip of polyolefine or polyolefine coated paper a layer of an organo-functional siloxane polymer solution is applied, that the layer applied is dried, and that the dried layer is electron radiated in order to bind the dried layer to the skeletal layer by means of covalent bindings between, on the one hand, vinyl groups in the organo-functional siloxane polymer and, on the other hand, carbon atoms in the polyolefine layer or polyolefine coating.

The siloxane polymer solution that is used in the method according to the invention can have a varying polymer concentration depending on what requirements concerning gas barrier properties are set for the laminate produced. Good results both as far as concerns gas barrier and aroma barrier are achieved at polymer concentrations between 5 and 25% weight, with the gas barrier properties increasing with increasing concentrations within this range.

BRIEF DESCRIPTION OF THE DRAWINGS

The invention will be described more closely below with reference to the enclosed drawings in which FIG. 1 only as an example shows a part of a strip of the packaging material according to a preferred embodiment of the invention.

DESCRIPTION OF THE PREFERRED EMBODIMENT

Figure 1:
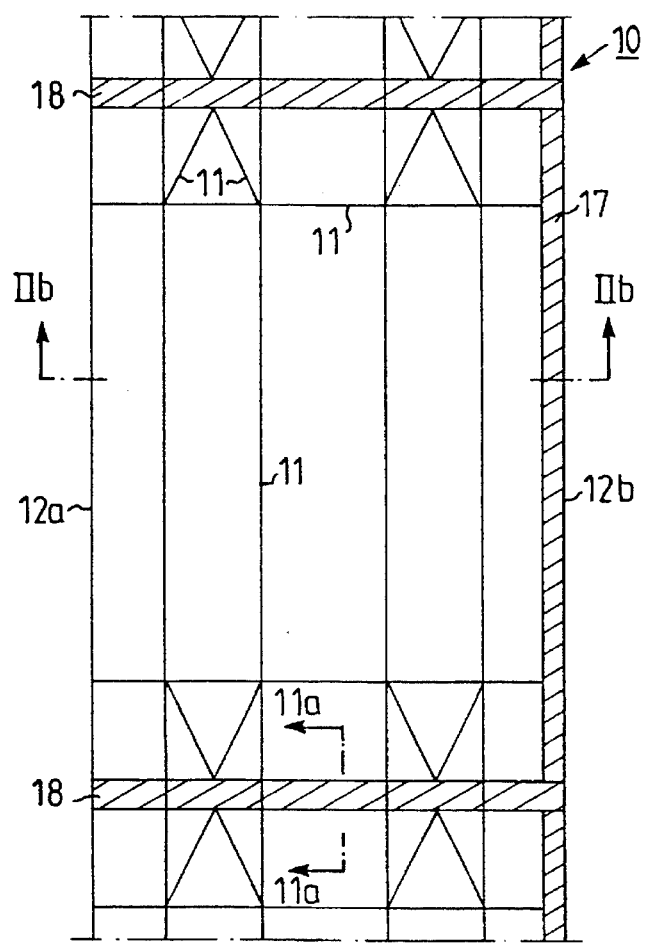

The packaging laminate in strip form according to the invention has been given the general designation 10 in FIG. 1. From the packaging laminate 10, which is of conventional main type with fold lines 11 facilitating folding, packaging containers are manufactured through the laminate first being shaped to a tube through the two longitudinal sides of the strip being joined to each other in an overlap joint through heat sealing. The tube is then filled with the desired contents and divided into closed cushion-like packagings through repeated transverse sealings of the tube across the longitudinal axis of the tube. The packagings are separated from each other by cutting or clipping in the transverse seals, after which the packagings are given the desired final form (usually of a parallelepiped) through folding in and sealing tight the double-wall triangular corner flaps to an adjacent side of the packaging.

Figure 2A:
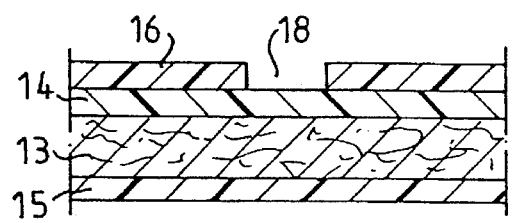
FIG. 2a is a cross section along the line IIa—IIa in FIG. 1.
Figure 2B:
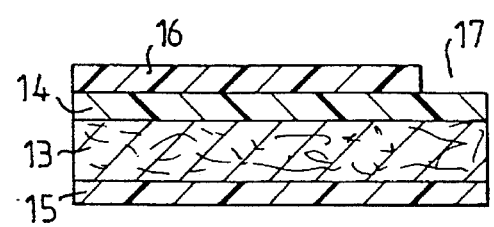
FIG. 2b is a cross section along the line IIb—IIb in FIG. 1.

As can be seen from FIGS. 2a and 2b the packaging laminate 10 comprises a stiffening skeletal layer 13 which can consist of paper or cardboard or of a polyolefine plastic. In the example shown it is assumed that the skeletal layer 13 consists of paper. On both sides of the skeletal layer there is a layer of polyolefine 14 and 15 bound to the skeletal layer, preferably polyethulene, and of these the polyolefine layer 15 is placed on the side of the packaging laminate which is intended to cover the outside of the packaging container after conversion of the packaging laminate. On the inside of the packaging laminate there is a layer of an organo-functional siloxane polymer 16 functioning as a gas and aroma barrier which is bound by means of covalent bonds to the skeletal layer 13 by the intermediate polyolefine layer 14.

The organo-functional siloxane polymer in the gas and aroma barrier layer 16 is preferably a hydrolyzed vinyl benzyl amine silane whose vinyl groups are covalently bound to carbon atoms in the intermediate polyolefine layer 14 in such a way that no Si fragment is released from the gas and aroma barrier layer 16 when the packaging laminate 10 is converted through fold forming into a packaging container in the manner described above.

It must be observed that FIGS. 2a and 2b are not presented to scale as far as concerns the thickness of the respective layers of the packaging laminate, but for gaining clarity the individual layers have been shown with the same or mainly the same mutual thicknesses. On the other hand FIGS. 2a and 2b correctly reproduce the mutual arrangement of the individual layers. Thus for example the skeletal layer 13 has a considerably greater thickness than the other layers forming part of the laminate, with the gas and aroma barrier layer 16 being the thinnest layer of the laminate in a class of its own. The skeletal layer 13 has for example a thickness of 100–300 μm while the gas and aroma barrier layer has a thickness of only 1–5, preferably about 2 μm.

In order to improve the sealing properties of the packaging laminate 10 the gas and aroma barrier layer 16 is omitted in those areas along which the packaging laminate 10 is to be sealed during conversion to packaging containers. These areas 17 and 18 are shown with oblique line markings in FIG. 1 and correspond to the edge zone 17 along the laminate's side 12b, which is intended in the formation of the tube to be folded to overlap with the other side of the laminate 12a to form the longitudinal overlap joint, and the transverse material zones 18 respectively along which the shaped tube is to be transversely sealed and clipped or cut in dividing up and separation of the packagings.

Figure 3:
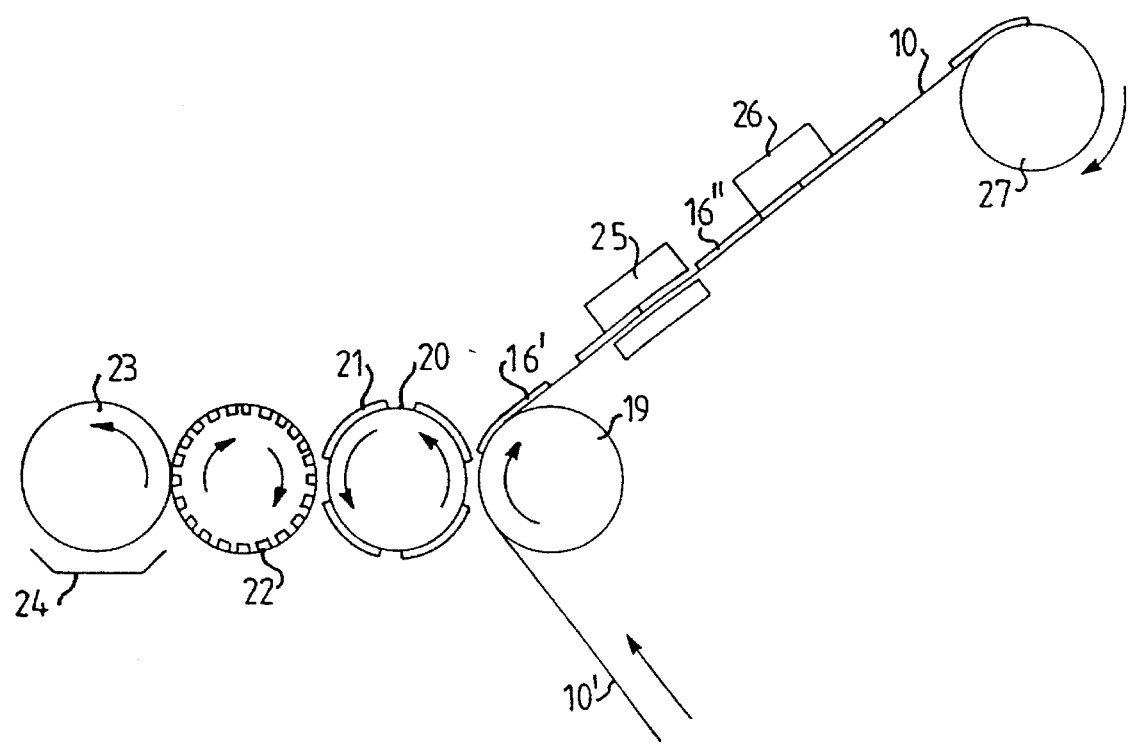
FIG. 3 illustrates a method of manufacturing the packaging laminate in strip form in FIG. 1.

The packaging laminate 10 in FIG. 1 is manufactured according to the invention in the manner reproduced schematically in FIG. 3. For the purpose of clarification the same reference designations as in FIGS. 1 and 2a–2b have been used for corresponding details in FIG. 3. A strip 10' of paper or cardboard with outer coatings of polyolefine is taken through the pinch between a rotating support roller 19 and a matrix roller 20 which carries on its surface matrices 21 in a surface pattern corresponding to the pattern according to which the strip 10' is to be coated with a layer of organo-functional siloxane polymer for manufacturing the finished laminate 10. The polymer-transferring matrices 21 on the surface of the roller 20 receive the polymer solution in question according to the flexo-print principle from a screen roller 22, bearing against the matrix roller, and to this in its turn the polymer solution is transferred from an immersion roller 23 bearing against the screen roller 22 and rotating partly immersed in a vat 24 containing the said solution. On passing through the pinch between the matrix roller 21 and the support roller 19 the polymer solution received on the matrices 21 from the screen roller is thus transferred to the strip 10' to form a layer 16' of polymer solution deposited in the desired pattern which in a subsequent stage is dried with the aid of a suitable drier 25 through or past which the strip 10' is taken. The dried layer 16" is then subjected to electron radiation at 26, whereby the siloxane polymer in the layer 16" is co-valently bound to the polyolefine layer 14 corresponding to the polyolefine coating of the strip 10'. The finished laminate 10 is then wound on to a supply roller 27. Practical tests have shown that a packaging laminate with particularly good gas and aroma barrier properties is produced in the manner according to the invention if the organo-functional siloxane polymer solution consists of a hydrolyzed vinyl benzyl amine silane with the designation Z-6032 (Dow Corning Corporation).

As can be seen from the above description it is thus possible to manufacture a packaging laminate of the type described in the introduction with excellent gas and aroma barrier properties without the use of chemical binding agents of the type previously used. The manufacture of the packaging laminate according to the invention is in addition easy to carry out and requires no complicated or extra process equipment.

It must finally be observed that the invention is not limited only to the embodiment described as an example and shown, but various modifications are possible without departing from the concept of the invention as this is defined by the patent claims below.

We claim:

1. Flexible packaging laminate in sheet or strip form for conversion by fold forming and sealing to a packaging container with gas and aroma barrier properties, wherein said packaging laminate comprises:

i) a skeletal layer;

ii) a gas and aroma barrier layer of a silicon-containing chemical substance applied to one side of the skeletal layer, wherein said barrier layer is localized only to those areas of the packaging laminate that are outside the areas along which the packaging laminate is to be sealed during conversion to said packaging container; and iii) an intermediate polyolefin layer placed between the skeletal layer and the gas and aroma barrier layer, wherein the gas and aroma barrier layer is covalently bound to the intermediate polyolefin layer.

2. Packaging laminate according to claim 1, wherein the silicon-containing chemical substance consists of an organo-functional siloxane polymer.

3. Packaging laminate according to claim 2, wherein the organo-functional siloxane polymer is a hydrolyzed vinyl benzyl amine silane, whereby the gas and aroma barrier layer is bound to the intermediate polyolefin layer by covalent bonds between the vinyl groups in the siloxane polymer and carbon atoms in the polyolefin chains of the intermediate layer.

4. Packaging laminate according to claim 1, wherein the gas and aroma barrier layer has a thickness of 1–2 μm.

5. Packaging laminate according to claim 1, wherein the gas and aroma barrier layer is applied and bound to the intermediate polyolefin by means of grafting technology, including the use of electron radiation.

6. Packaging laminate according to claim 1, wherein the skeletal layer consists of paper or cardboard.

7. Packaging laminate according to claim 1, wherein the gas and aroma barrier layer is placed as the outer layer on that side of the skeletal layer which, after conversion of the packaging laminate, is to face the interior of the packaging container.

8. Packaging container manufactured through fold forming and sealing of a packaging laminate according to claim 1.

9. Packaging laminate according to claim 1, wherein the gas and aroma barrier layer has a thickness of between about 1 and 5 μm.

10. A flexible packaging laminate in sheet or strip form for conversion by fold forming and sealing to a packaging container with gas and aroma barrier properties, wherein said packaging laminate comprises:

i) a polyolefin skeletal layer; and ii) a gas and aroma barrier layer of a silicon-containing chemical substance applied to one side of the skeletal layer, wherein said barrier layer is localized only to those areas Of the packaging laminate that are outside the areas along which the packaging laminate is to be sealed during conversion to said packaging container, and wherein the gas and aroma barrier layer is covalently bound to the skeletal layer.

* * * * *